US009915832B2

(12) United States Patent
Horie et al.

(10) Patent No.: US 9,915,832 B2
(45) Date of Patent: Mar. 13, 2018

(54) OPTICAL PHASED ARRAY USING GUIDED RESONANCE WITH BACKSIDE REFLECTORS

(71) Applicant: CALIFORNIA INSTITUTE OF TECHNOLOGY, Pasadena, CA (US)

(72) Inventors: Yu Horie, Pasadena, CA (US); Amir Arbabi, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/282,592

(22) Filed: Sep. 30, 2016

(65) Prior Publication Data

US 2017/0023804 A1    Jan. 26, 2017

Related U.S. Application Data

(63) Continuation of application No. 14/814,421, filed on Jul. 30, 2015, now Pat. No. 9,482,887.

(60) Provisional application No. 62/032,327, filed on Aug. 1, 2014.

(51) Int. Cl.
| | |
|---|---|
| G02F 1/07 | (2006.01) |
| G02F 1/00 | (2006.01) |
| G02F 1/017 | (2006.01) |
| G02F 1/01 | (2006.01) |
| G02F 1/29 | (2006.01) |
| G02F 1/19 | (2006.01) |
| G02F 1/015 | (2006.01) |

(52) U.S. Cl.
CPC .......... *G02F 1/017* (2013.01); *G02F 1/0107* (2013.01); *G02F 1/19* (2013.01); *G02F 1/292* (2013.01); *G02F 2001/0151* (2013.01); *G02F 2001/0154* (2013.01); *G02F 2201/307* (2013.01); *G02F 2203/10* (2013.01); *G02F 2203/12* (2013.01); *G02F 2203/18* (2013.01)

(58) Field of Classification Search
USPC ................................ 359/259–279, 245, 325
See application file for complete search history.

(56) References Cited

U.S. PATENT DOCUMENTS

| | | | |
|---|---|---|---|
| 5,999,319 A | 12/1999 | Castracane | |
| 6,288,824 B1 * | 9/2001 | Kastalsky | G02B 26/02 359/254 |
| 8,280,054 B2 * | 10/2012 | Bratkovski | G02B 1/007 359/245 |

(Continued)

OTHER PUBLICATIONS

International Preliminary Report on Patentability for International Application No. PCT/US2015/043018 filed Jul. 30, 2015 on behalf of California Institute of Technology, dated Feb. 16, 2017. 9 pages.

(Continued)

*Primary Examiner* — Mohammed Hasan
(74) *Attorney, Agent, or Firm* — Steinfl + Bruno LLP

(57) ABSTRACT

Methods and systems for controlling the phase of electromagnetic waves are disclosed. A device can consist of a guided resonance grating layer, a spacer, and a reflector. A plurality of devices, arranged in a grid pattern, can control the phase of reflected electromagnetic phase, through refractive index control. Carrier injection, temperature control, and optical beams can be applied to control the refractive index.

21 Claims, 6 Drawing Sheets

(56) References Cited

U.S. PATENT DOCUMENTS

| | | | |
|---|---|---|---|
| 8,999,759 B2 * | 4/2015 | Chia | H01L 23/5389 |
| | | | 257/678 |
| 9,482,887 B2 | 11/2016 | Horie et al. | |
| 2015/0234221 A1 | 8/2015 | Anderson et al. | |
| 2016/0033755 A1 | 2/2016 | Horie et al. | |

OTHER PUBLICATIONS

International Preliminary Report on Patentability for International Application No. PCT/US2015/043014 filed Jul. 30, 2015 on behalf of California Institute of Technology, dated Feb. 16, 2017. 11 pages.
Non-Final Office Action for U.S. Appl. No. 14/814,425, filed Jul. 30, 2015 on behalf of Yu Horie, dated Jul. 28, 2016. 17 pages.
Final Office Action for U.S. Appl. No. 14/814,425, filed Jul. 30, 2015 on behalf of Yu Horie, dated Nov. 8, 2016. 15 pages.

* cited by examiner

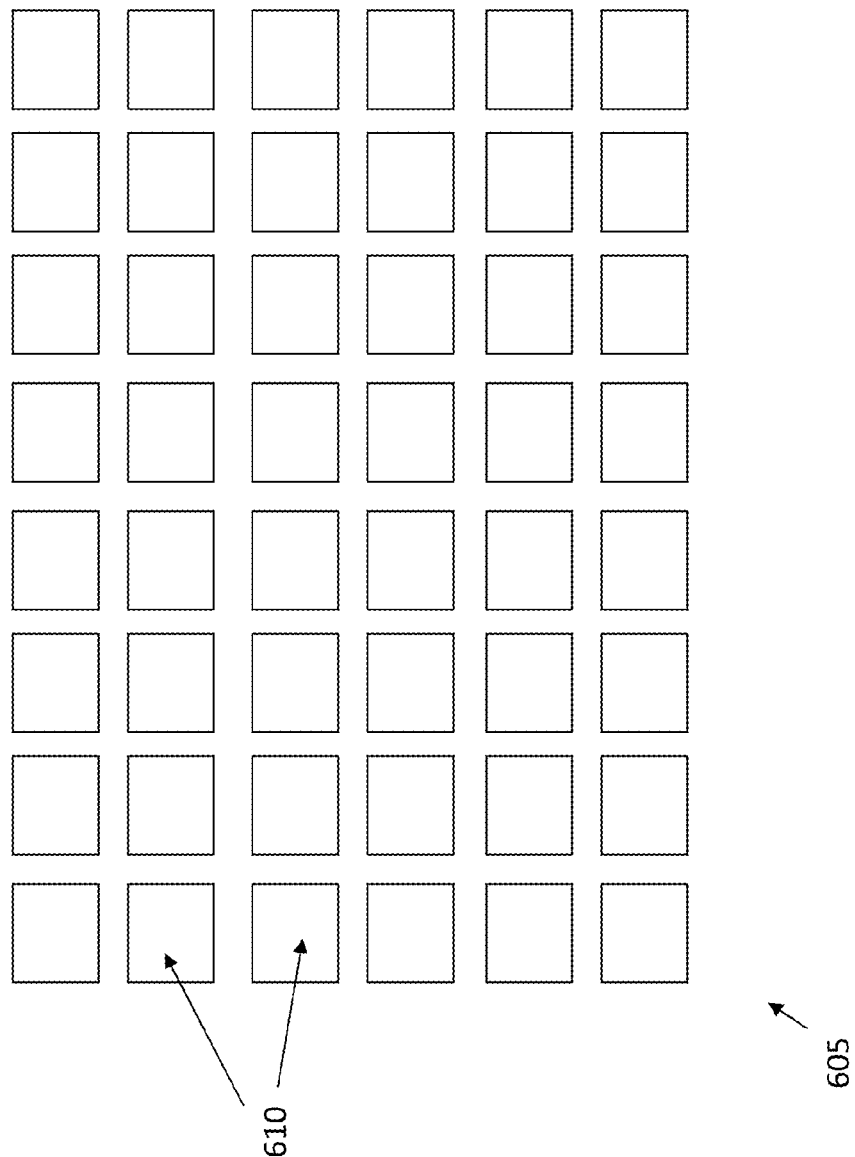

US 9,915,832 B2

OPTICAL PHASED ARRAY USING GUIDED RESONANCE WITH BACKSIDE REFLECTORS

CROSS REFERENCE TO RELATED APPLICATIONS

The present application is a continuation of U.S. patent application Ser. No. 14/814,421 filed on Jul. 30, 2015 Now U.S. Pat. No. 9,482,887 B2 which claims priority to U.S. Provisional Patent Application No. 62/032,327, filed on Aug. 1, 2014, the disclosures of both of which are incorporated herein by reference in their entirety.

STATEMENT OF INTEREST

This invention was made with government support under DE-SC0001293/T-107198 awarded by the Department of Energy. The government has certain rights in the invention. The invention described herein was made in the performance of work under a NASA contract, and is subject to the provisions of Public Law 96-517 (35 USC 202) in which the Contractor has elected to retain title.

TECHNICAL FIELD

The present disclosure relates to optical phased arrays. More particularly, it relates to optical phased array using guided resonance with backside reflectors.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 6 illustrates an array of devices.

SUMMARY

Figure 1:
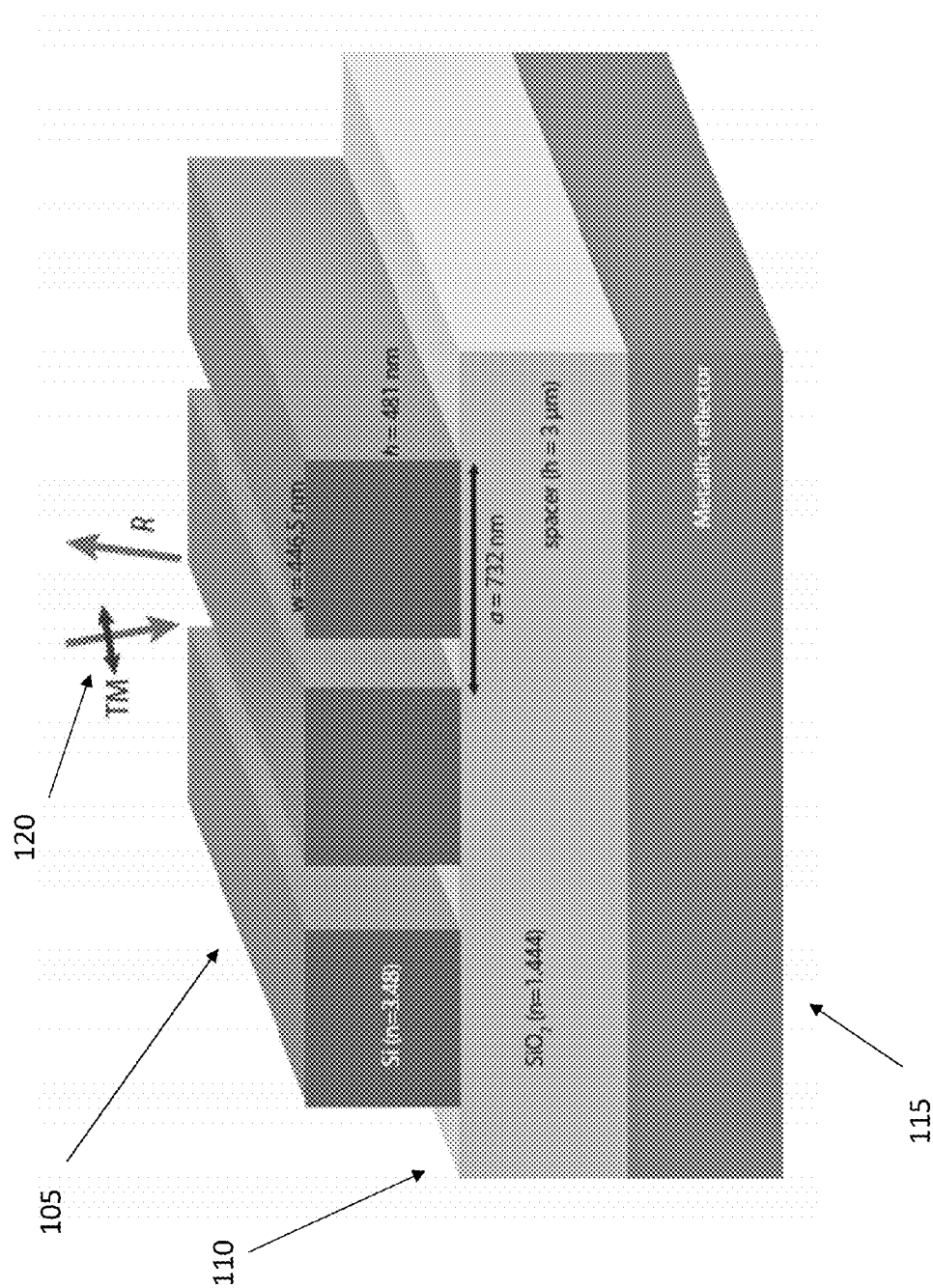
FIG. 1 illustrates a cross-sectional schematic of one embodiment of the devices of the present disclosure.

In a first aspect of the disclosure, a device to control phase of electromagnetic waves is described, the device comprising: a grating comprising parallel beams, the grating being a resonance layer capable of sustaining a guided resonance of electromagnetic waves; a reflector layer; and a spacer layer between the reflector layer and the resonance layer.

In a second aspect of the disclosure, a method to control phase of electromagnetic waves is described, the method comprising: providing an array of devices arranged in a grid pattern, each device comprising: a grating comprising parallel beams, the grating being a resonance layer capable of sustaining a guided resonance of electromagnetic waves; a reflector layer; and a spacer layer between the reflector layer and the resonance layer; calculating a desired phase pattern for electromagnetic waves reflected by the array; controlling the refractive index of each device according to the desired phase pattern.

DETAILED DESCRIPTION

Phased array optics (PAO) are directed at controlling the phase of electromagnetic (or light) waves transmitting or reflecting from a two-dimensional surface. This control is achieved through adjustable surface elements. By dynamically controlling the optical properties of a surface on a microscopic scale, it is possible to steer the direction of light beams, or the view direction of sensors. Phased array beam steering can be used, for example, for optical switching and multiplexing in optoelectronic devices, and for aiming laser beams on a macroscopic scale.

For example, if a beam of light is transmitted across a specific area, phased array optics can comprise a way to control the phase of the light waves in different regions of that specific area. In some applications, each region of that specific area can be termed as a pixel. Through this control, the output light beam can be adjusted to different conditions. For example, a light beam, such as a laser beam, could be transmitted through atmospheric disturbances that can negatively impact the beam characteristics. By controlling the phase of the light waves, the beam can be adjusted so that the negative influence of atmospheric disturbances can be reduced or negated.

Optical phased arrays (OPAs) are a versatile platform for many applications including, for example, beam steering, adaptive optics, Fourier optics, and holography. In an optical phased array, each pixel element individually controls the phase of the electromagnetic waves propagating in free space or in a medium. Commercially available OPAs rely on phase modulators based on liquid crystals (LC), however the slow response of LCs bounds the operational speed of such phase modulators to less than kHz frequencies. Standard micro-electro-mechanical systems (MEMS) enable a slightly higher operation speed, typically less than MHz frequency (see Ref. [1]), but can involve a complex device design, which can make such systems less suitable for mass production of the OPA devices.

The phase modulation scheme described in the present disclosure utilizes phase delay accompanied by a resonance. The cross-sectional schematic of one embodiment of the device described in the present disclosure is depicted in FIG. 1. In FIG. 1, a sub-wavelength grating (105), which possesses a guided resonance, sits on a metal reflector (115) separated by a silicon dioxide layer (110), for example a 3-micron silicon dioxide layer. In the embodiment of FIG. 1, the grating (105) comprises sections of Si with a height of 481 nm, a width of 446.5 nm and a spacing of 732 nm. In other embodiments, the dimensions of the grating may be adjusted according to the desired electromagnetic resonance.

In some embodiments, different materials may be used compared to the example of FIG. 1. For example, the reflector may be a metal, or a non-metallic material. The main property of the reflector is its ability to reflect electromagnetic waves, therefore any structure that possesses this property may be used. For example, instead of a continuous metallic layer, a reflector may consist in a grating, for example a Si grating tuned to reflect the electromagnetic waves. For example, a sub-wavelength grating made of high refractive index materials may be used in some embodiments. Broadband ultra-high reflectivity gratings may be used.

Figure 4:
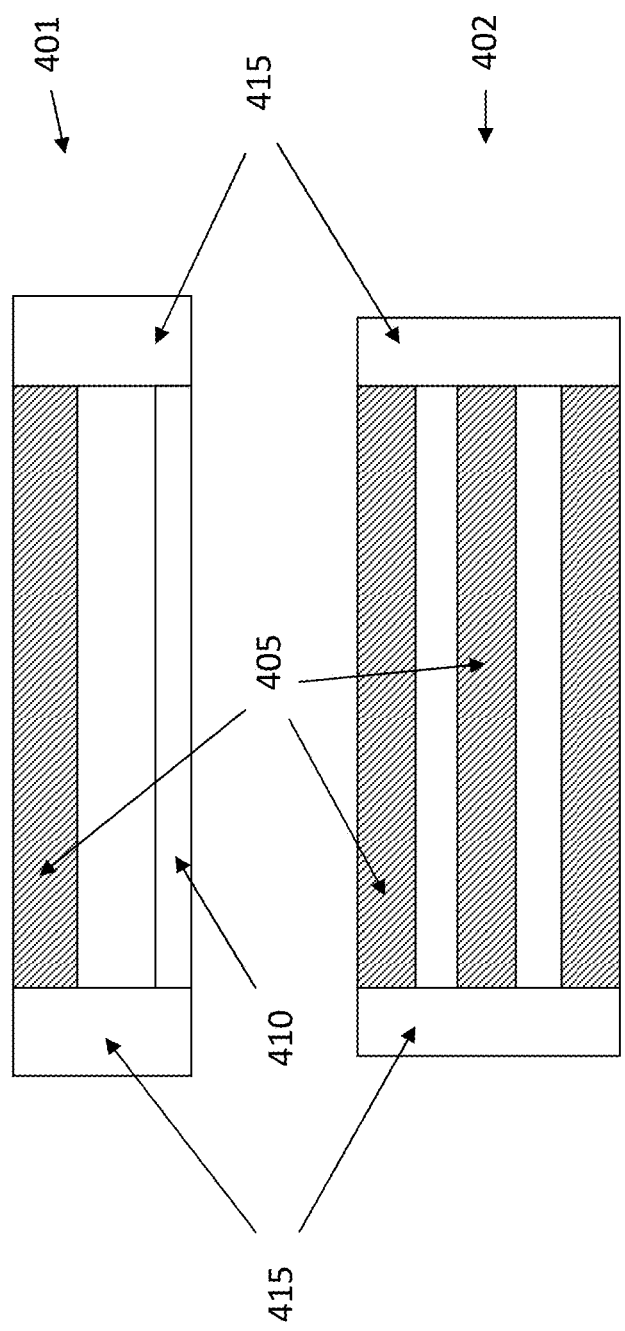
FIG. 4 illustrates a suspended beam grating

In some embodiments, the spacer layer (110) may comprise different materials instead of silicon dioxide. The spacer layer may even consist of air, with the beams of the grating (105) suspended at each end. For example, as visible in FIG. 4 as side view (401) and top view (402), the beams of the grating (405) may be suspended at each end to a side structure (415), for example a Si structure, with a reflector (410) at the bottom.

In the embodiment of FIG. 1, the sub-wavelength grating supports even symmetric guided modes (see Ref. [2]), therefore a 0.5° tilted off-axis plane wave with a transverse-magnetic (TM) polarization can be used as an incident wave (120) with a wavelength of around 1.55 um. In this example the magnetic field is orthogonal to the direction of propagation of the electromagnetic wave.

By placing an external metal reflector (115) underneath the grating, with an appropriate separation length, typically longer than a wavelength of light, it is expected that the reflected amplitude is constant regardless of the guided resonance, while the reflected phase change becomes dispersive about $2\pi$ because of the coupling with the guided resonance inside the sub-wavelength grating. The modulation of the phase can be done by tuning the frequency of the guided resonance, by means of refractive index tuning of grating materials, see Ref [3]. For instance, in the case of silicon as a material choice for grating bars, the carrier injection method (see Ref [4]) or thermo-optic effect will be able to efficiently tune the resonance.

For the refractive index tuning of the grating material, different methods may be employed. For example, a current may be injected in the grating to change its refractive index. The current may be injected in the longitudinal direction of the beams of the grating, or it may be injected perpendicularly to the longitudinal direction of the beams of the grating. Therefore, the current may be in plane or perpendicularly to the plane of the grating layer. In some embodiments, the current may be injected using transparent conductive materials, for example indium tin oxide (ITO).

Figure 5:
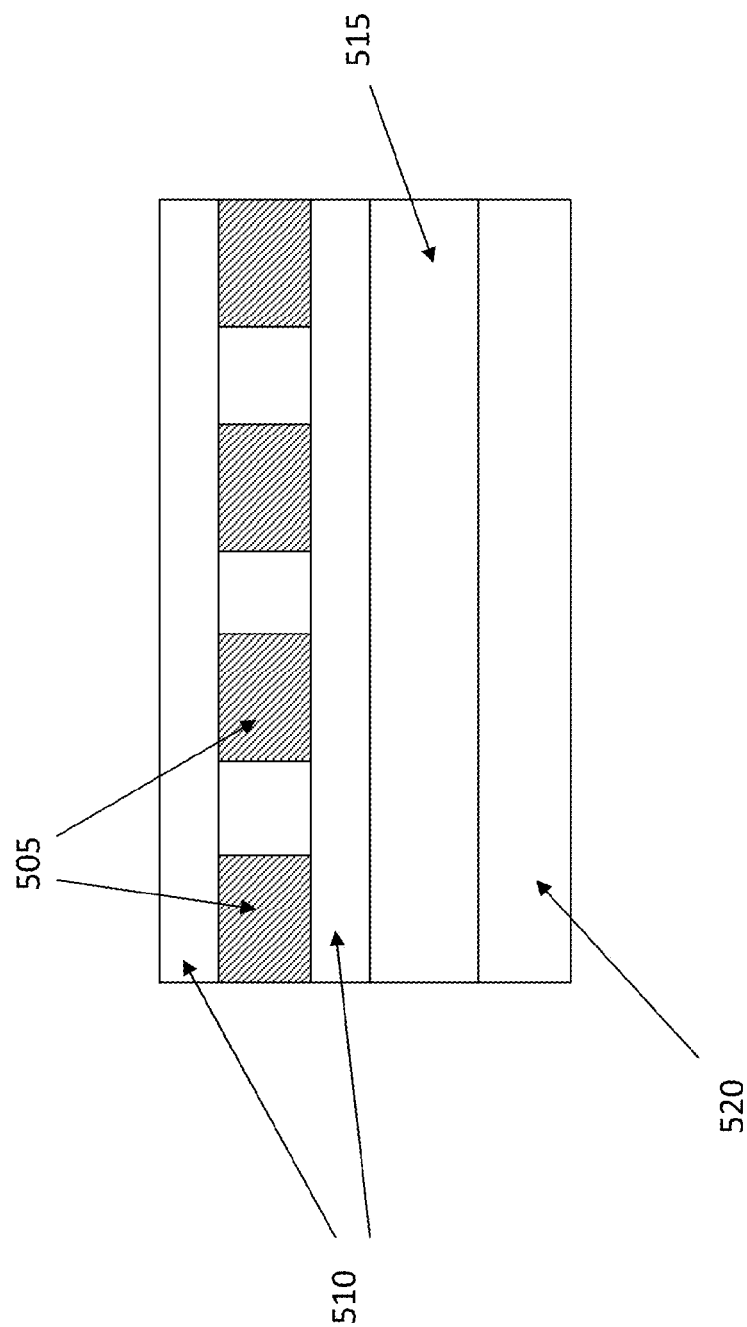
FIG. 5 illustrates charge carrier control with transparent electrodes.

For example, referring to FIG. 5, a current may be injected in the grating (505) through a top and bottom transparent ITO electrode layers (510). The structure may also comprise a spacer (515), such as, for example, silicon dioxide or air, and a reflector (520), such as, for example, a metal layer or a reflecting Si grating layer. Many different materials may be used for the grating, as long as they enable use of a guided resonance. For example Si or SiN may be used.

The resonance of the grating may be controlled through a voltage (current injection). Other methods comprise temperature control, and optical control. Either through the control of temperature, or the application of, for example, a laser beam to the grating, the resonance may be controlled through the control of the refractive index. The refractive index can be controlled through the regulation of the charge carrier density.

Figure 2:
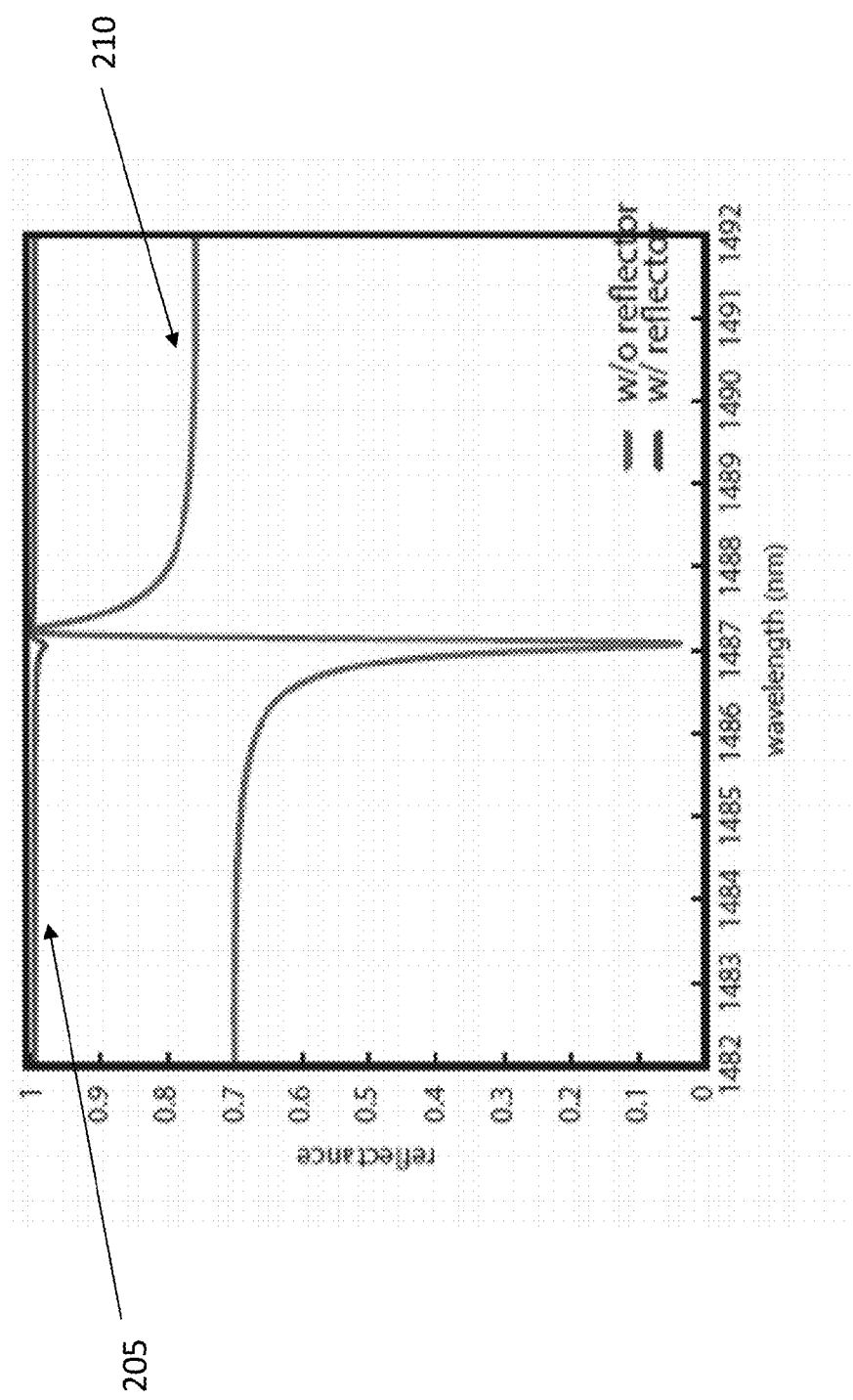
FIG. 2 illustrates reflectance data of one embodiment of the devices of the present disclosure.
Figure 3:
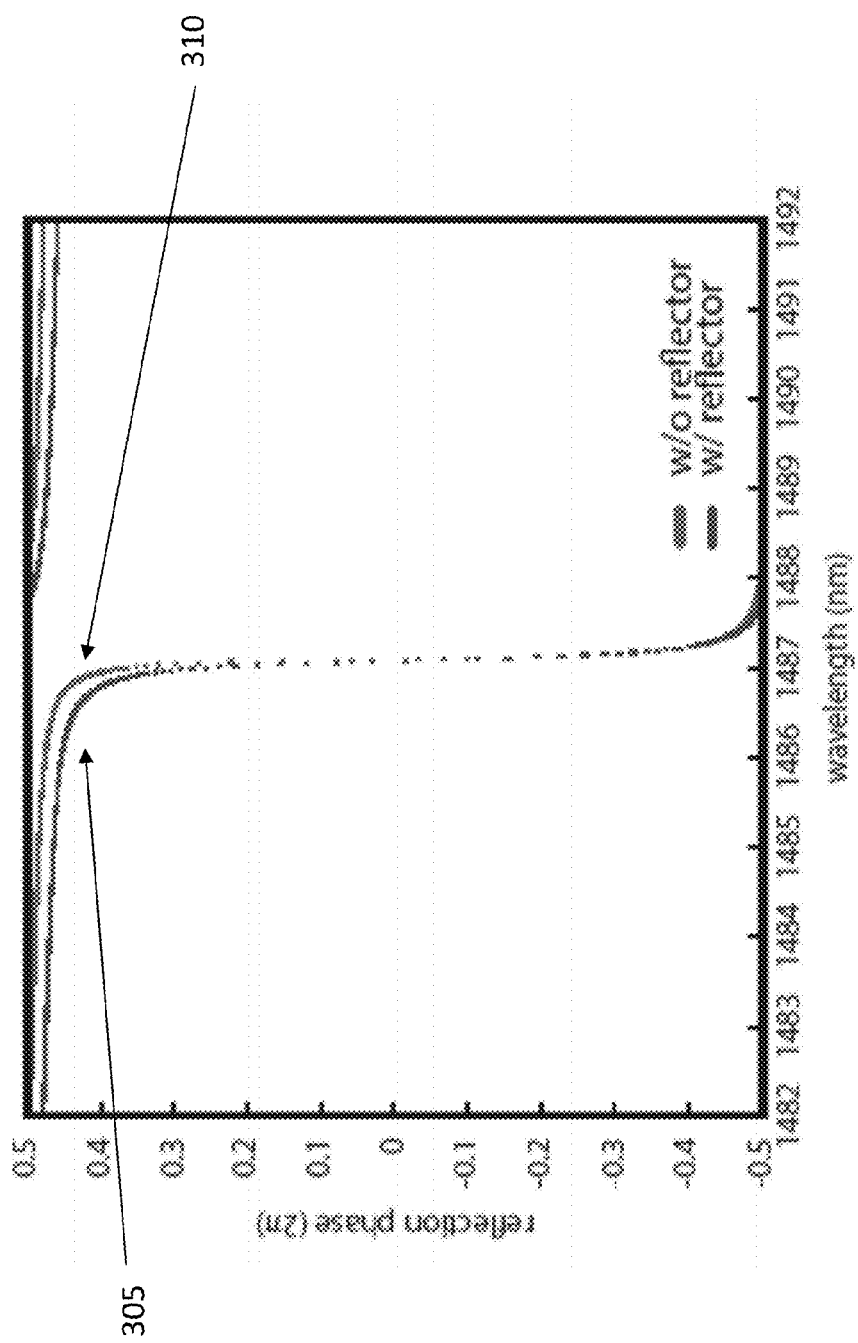
FIG. 3 illustrates reflectance phase data of one embodiment of the devices of the present disclosure.

Using rigorous coupled-wave analysis (RCWA) simulations, reflectivity spectra as well as the reflection phase as a function of wavelength can be calculated for the two cases, with and without the backside reflector, as shown in FIGS. 2 and 3. Rigorous coupled-wave analysis (RCWA) is a semi-analytical method in computational electromagnetics that can be applied to solve scattering from periodic dielectric structures. It is a Fourier-space method so devices and fields are represented as a sum of spatial harmonics. For the case with backside reflector, while the reflectivity is kept constant around the guided resonance frequency, the reflected phase acquires a $2\pi$ differential, as expected. The phase modulation can be reasonably realized via index modulation of high index materials, thus enabling high-speed modulation with very high bandwidth in the hundreds MHz. By placing such a phase modulator in a two dimensional fashion, OPAs working at a very high speeds can be realized.

FIG. 6 illustrates an array of devices (605), each device as described above in the present disclosure. Each of the devices (610) can control the phase of electromagnetic waves incident at the area of the specific device. Each of the devices can be controlled as described in the present disclosure above, for example by controlling the refractive index of the grating of that specific device by charge injection. In other words, an array of devices allows control of phase that can be individually tuned in each area. Each of the devices may be termed as controlling a pixel of the overall area controlled by the array. Each of the devices can be controlled individually, for example through individual application of voltage and currents. In this way, a varying phase control can be applied to an incident electromagnetic wave, according to the specific application. In some embodiments, the separation between each device in the array can be minimized, in order to have a fine grain control of the phase of the incident electromagnetic waves.

In the examples above in the present disclosure, a grating of longitudinal beams has been described as an example. However, it is intended that any structure capable of sustaining a guided resonance may also be used. For example, gratings different from longitudinal beams may be used.

In some embodiments, a desired phase pattern for electromagnetic waves reflected by an array of the devices can be realized by controlling the refractive index of each device of the array. In some embodiments, the incident phase can also be measured prior to applying the phase control through the array. In other embodiments, the phase may be already known or estimated, therefore no measurement may be necessary. In some embodiments, the gratings can be made of materials other than silicon, such as for example germanium, gallium arsenide, gallium phosphide and silicon nitride A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] W. Yang, T. Sun, Y. Rao, M. Megens, T. Chan, B.-W. Yoo, D. A. Horsley, M. C. Wu, and C. J. Chang-Hasnain, "High-speed optical phased array using high-contrast grating all-pass filters," in Indium Phosphide and Related Materials IPRM, International Conference on (IEEE, 2012) pp. 22-24.

[2] J. M. Foley, S. M. Young, and J. D. Phillips, "Symmetry-protected mode coupling near normal incidence for narrow-band transmission filtering in a dielectric grating," Phys. Rev. B 89, 165111 (2014).

[3] Y. Horie, A. Arbabi, and A. Faraon, "Reflective Optical Phase Modulator Based on High-Contrast Grating Mirrors," CLEO: Science and Innovations (2014).

[4] C. Qiu, J. Chen, Y. Xia, and Q. Xu, "Active dielectric antenna on chip for spatial light modulation," Sci. Rep. 2, 855 (2012).

What is claimed is:

1. A device to control phase of electromagnetic waves, comprising:
a grating comprising parallel beams, the grating being a resonance layer capable of sustaining a guided resonance of electromagnetic waves;
a reflector layer;
a spacer layer between the reflector layer and the resonance layer;
a first transparent electrode layer between the grating and the spacer layer; and
a second transparent electrode layer on a surface of the grating opposite to that of the first transparent electrode layer.

2. The device of claim 1, wherein the spacer layer is made of a transparent material.

3. The device of claim 2, wherein the grating is made of silicon.

4. The device of claim 3, wherein the reflector layer is a metallic layer.

5. The device of claim 3, wherein the reflector layer is a silicon grating.

6. The device of claim 1, wherein the spacer layer is made of silicon dioxide.

7. The device of claim 1, wherein the parallel beams are parallelepipeds.

8. The device of claim 1, wherein the first and second transparent electrode layers are made of indium tin oxide.

9. An array to control phase of electromagnetic waves comprising:
a plurality of devices according to claim 1, arranged in a grid pattern.

10. The array of claim 9, wherein the grid pattern is a chequerboard pattern.

11. A method to control phase of electromagnetic waves, comprising:
providing an array of devices arranged in a grid pattern, each device including:
a grating comprising parallel beams, the grating being a resonance layer capable of sustaining a guided resonance of electromagnetic waves,
a reflector layer,
a spacer layer between the reflector layer and the resonance layer,
a first transparent electrode layer between the grating and the spacer layer, and
a second transparent electrode layer on a surface of the grating opposite to that of the first transparent electrode layer;
calculating a desired phase pattern for electromagnetic waves reflected by the array; and
controlling the refractive index of each device according to the desired phase pattern.

12. The method of claim 11, further comprising measuring a phase pattern of electromagnetic waves incident on the array.

13. The method of claim 11, wherein the grid pattern is a chequerboard pattern.

14. The method of claim 13, wherein the grating is made of silicon.

15. The method of claim 14, wherein the reflector layer is a metallic layer.

16. The method of claim 14, wherein the reflector layer is a silicon grating.

17. The method of claim 11, wherein the spacer layer is made of silicon dioxide.

18. The method of claim 11, wherein the parallel beams are parallelepipeds.

19. The method of claim 11, wherein the first and second transparent electrode layers are made of indium tin oxide.

20. The method of claim 11, wherein controlling the refractive index of each device comprises injecting a current through the first and second transparent electrode layers of each device, wherein the current injected in each device is according to the desired phase pattern.

21. The method of claim 20, wherein at least one current value injected in a device of the array is different from at least one other current value injected in a different device of the array.

* * * * *